UNITED STATES PATENT OFFICE.

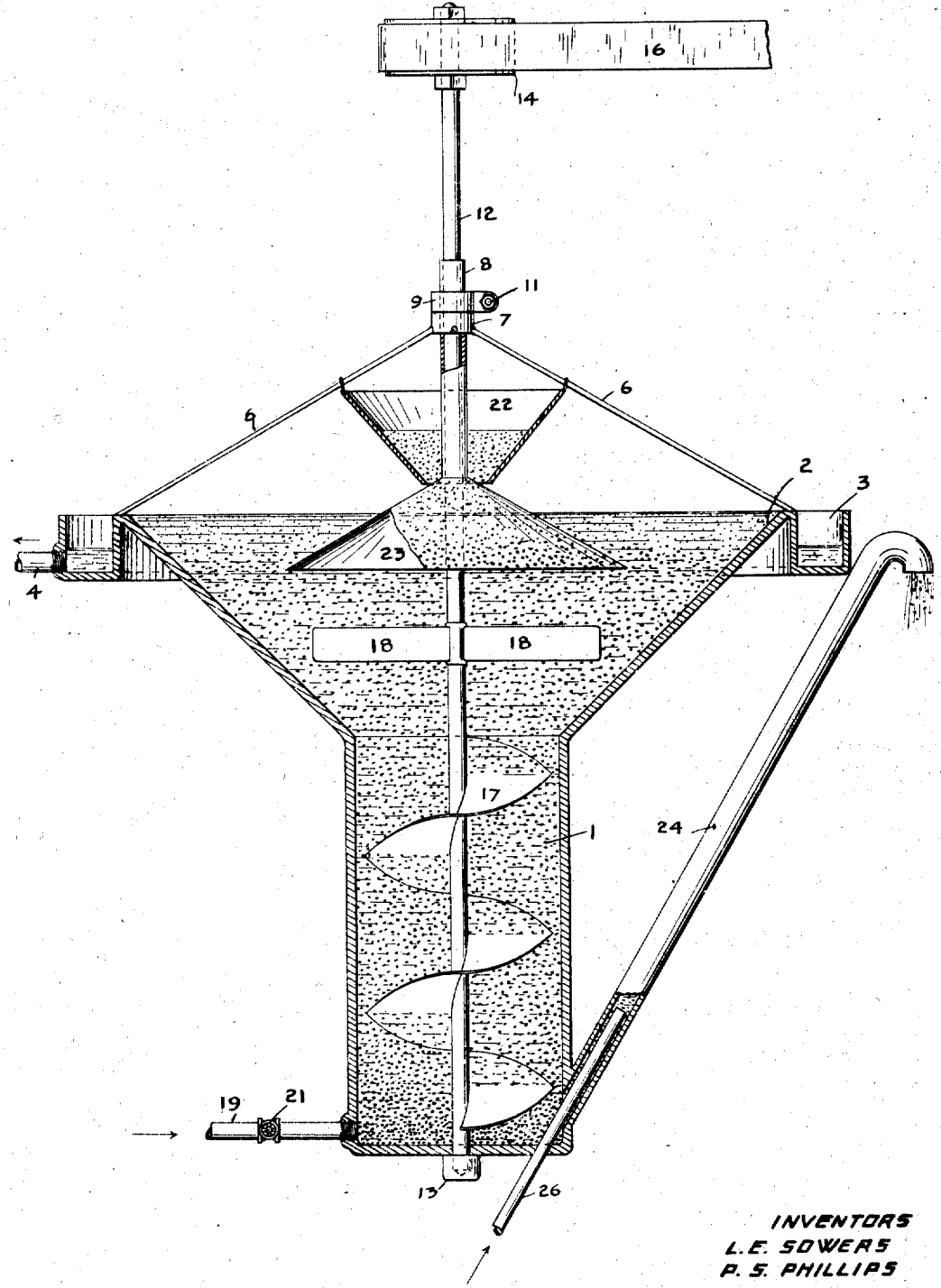

LEROY E. SOWERS AND PRESTON S. PHILLIPS, OF LIVERMORE, CALIFORNIA.

SEPARATOR FOR SEPARATING MANGANESE DIOXID FROM ORES CONTAINING THE SAME.

1,277,145.  Specification of Letters Patent.  Patented Aug. 27, 1918.

Application filed October 30, 1917. Serial No. 199,255.

*To all whom it may concern:*

Be it known that we, LEROY E. SOWERS and PRESTON S. PHILLIPS, citizens of the United States, and residing in the town of Livermore, in the county of Alameda, in the State of California, have invented new and useful Improvements in Separators for Separating Manganese Dioxid from Ores Containing the Same, of which the following is a specification.

The object of the present invention is to provide an improved apparatus for separating dioxid of manganese from other manganese compounds and silica in ores or other mixtures containing the same.

In the accompanying drawing, the figure is a vertical longitudinal section of our improved apparatus.

Referring to the drawing, 1 indicates a vertically extending separating chamber having a flaring or conical upper portion or mouth 2. Surrounding said upper portion, and attached to its edge, is a circular trough 3, from which leads a discharge conduit 4. Secured to the upper edge of said portion 2 are the lower ends of arms 6 which extend inwardly and are connected to a central circular bearing 7 through which extends a tubular hanger 8, having a collar 9 adjustable, as shown at 11, upon a vertical shaft 12 extending through said hanger and stepped at its lower end in a step bearing 13 in the bottom of the separating chamber. On the upper end of the shaft 12 is a pulley 14 which can be rotated by a belt 16 driven from any suitable source of power. Thereby rotation is imparted to the shaft 12 and also to an agitating screw 17 on said shaft in said separating chamber and to agitator arms 18 extending from said shaft in said upper portion 2.

Water is supplied to said separating chamber by an inlet pipe 19 controlled by a valve 21, and flows upwardly in said separating chamber. It is given a rotary motion by said agitating screw 17 and arms 18. Pulverized ore containing silica and manganese compounds including dioxid is fed into a hopper or chute 22 and drops upon the upper portion of a distributing cone 23 which is attached to the lower end of the tubular hanger 8, and the position of which with reference to the hopper, can be adjusted by adjusting the position of the hanger. The specific gravity of some masses of dioxid of manganese, with included air, is less than 1, and therefore a rotary motion of the water in the upper chamber 2 has the effect of separating the manganese compounds other than dioxid and silica, which being heavier than water, sink therein, while the dioxid of manganese with included air floats on the surface of the water and is carried thereby to the outer edge of the conical upper portion 2 of the separating chamber, and is eventually floated from the same with the water which is continually flowing into the trough 3.

Although such masses of dioxid of manganese with included air are considerably lighter than water, it has not been found possible heretofore to separate them from substances heavier than water, such as other manganese compounds and silica, by ordinary methods which take advantage of the difference in the specific gravities of such materials for the reason that, if the dioxid of manganese is not quickly separated, it loses its included air, becomes completely saturated or soaked with water, and its specific gravity is then greater than that of water. In our improved process we rapidly separate the manganese dioxid before it has time to be thus saturated or soaked with water, and this we do by imparting a rotary motion to the water, which then quickly carries the light material outward by centrifugal force.

The other manganese compounds and silica sink to the bottom of the separating chamber and escape therefrom by an upwardly extending tube 24 leading from a side of the separating chamber near the bottom, and, said manganese compounds and silica being very heavy, their ascent in said tube 24 is facilitated by a jet of water under high pressure injected into said tube 24 through a narrow tube 26 entering the bottom of said tube 24.

We claim: —

In an apparatus for separating the constituents of ore, the combination of a separating chamber symmetrical with respect to a central axis and having a flaring upper portion open at the top, a trough closely surrounding the rim of said upper portion, a distributing cone centrally located in the upper portion of said chamber and depending below its rim, means for discharging dry, pulverized ore on to said distributing cone uniformly around its axis, and means for causing water to flow upwardly in said separating chamber with substantial uniformity on all sides of its central axis.

LEROY E. SOWERS.
PRESTON S. PHILLIPS.